UNITED STATES PATENT OFFICE.

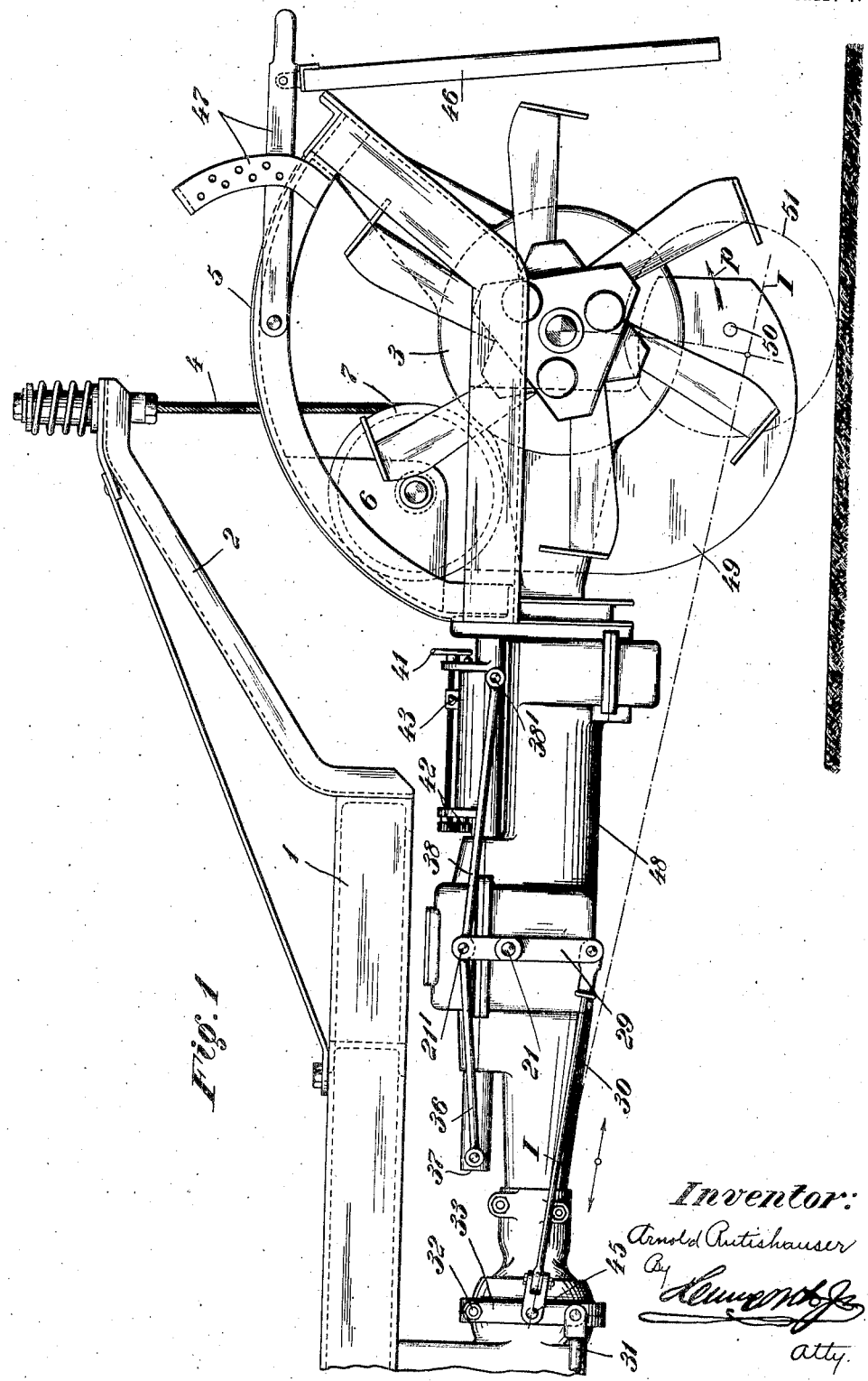

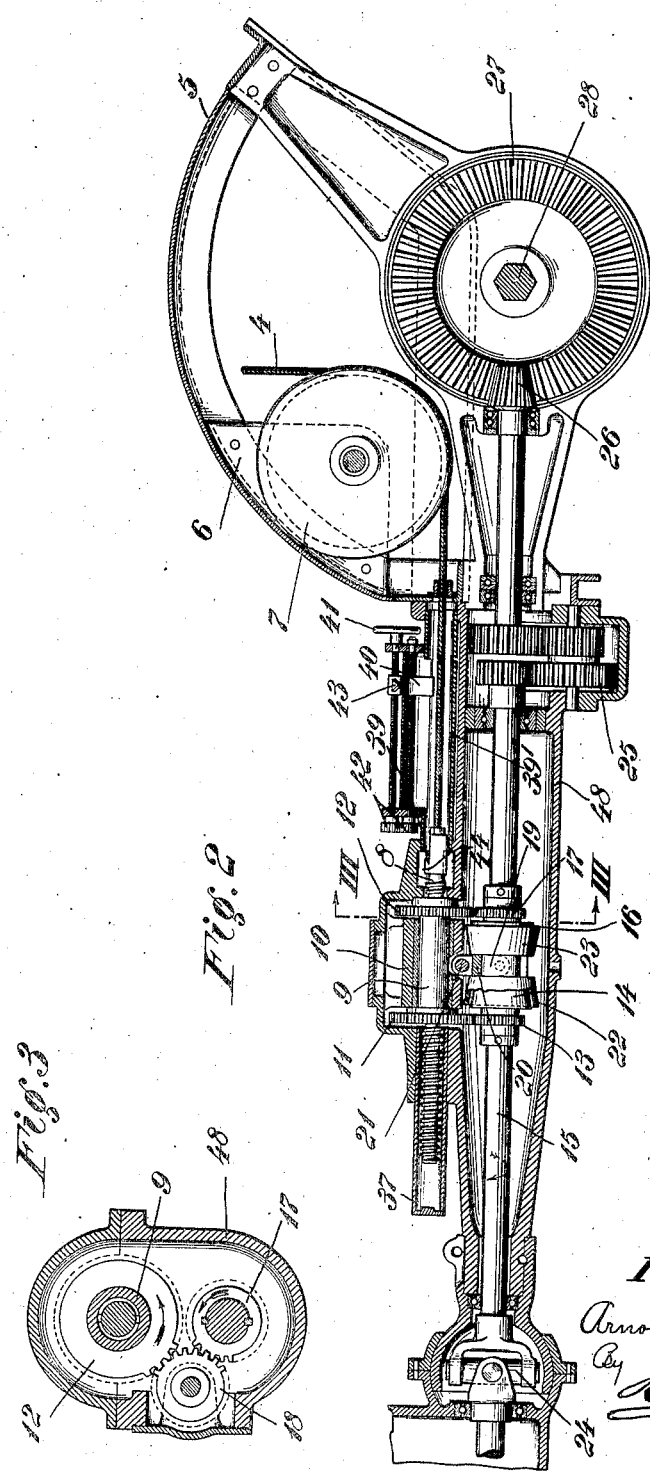

ARNOLD RUTISHAUSER, OF OLTEN, SWITZERLAND, ASSIGNOR TO THE FIRM MOTOR-WAGENFABRIK BERNA A.-G., OF OLTEN, SWITZERLAND.

ROTARY EARTHWORKING-MACHINE.

1,368,355.  Specification of Letters Patent.  Patented Feb. 15, 1921.

Application filed April 8, 1920. Serial No. 372,190.

*To all whom it may concern:*

Be it known that I, ARNOLD RUTISHAUSER, a citizen of the Republic of Switzerland, residing at Olten, Felsenstrasse 853, Switzerland, have invented certain new and useful Improvements in Rotary Earthworking-Machines; and I do hereby declare the following to be a clear, full, and exact description of the invention, such as will enable others skilled in the art to which it appertains to make and use the same, reference being had to the accompanying drawings and to letters or figures of reference marked thereon, which form a part of this specification.

Earth-working machines with mechanically rotated hoe drums are generally used in connection with rotary tractors. In most cases a tractor cannot be exclusively used for hoeing work and, as not every class of soil is suitable for being worked by hoeing, the same tractor is also used for plowing. This circumstance necessitates a quick dismantling of the hoe drum.

In the hitherto known constructions of hoe drums connected to tractors dismantling the hoe drums can not be carried out with the desired speed. The known tractors are fitted with a special device for lifting and lowering the hoe drum mounted on the tractor. On dismantling the hoe drum the hoisting device has to be dismantled as well. This is a comparatively tedious work because the hoisting device is also driven from the driving shaft of the tractor like the hoe drum so that in order to detach the hoe drum from the tractor two drives have to be disconnected. Another disadvantage inherent to the known constructions is the undesirable increase in weight of the rear part of the tractor caused by this separate hoisting device.

The object of the present invention is to overcome these difficulties by avoiding the separate hoisting device. To this end the device for lifting the hoe drum is combined with the hoe drum, it being driven by the driving shaft of the tractor and the drive is arranged so that lifting and lowering of the hoe drum can be carried out while the drum is working, by means of a reversing gear inserted in the drive of the lifting gear. Preferably provisions are made to limit the lifting and lowering movement of the hoe drum at any desired point by a hand operated control gear and automatically at the ends of the desired movement by stops. The point from which the hoe drum is advantageously suspended is fixed on the tractor.

In contradistinction to the heretofore known agricultural earth-working machines with mechanically rotated hoe drums wherein the hoisting device is arranged as an apparatus separated from the hoe drum, in the case of the present invention the hoisting device and the hoe drum are combined in a single assemblage whereby the weight is considerably decreased as compared with the arrangement mentioned above where hoe drum and the hoisting device for same consist of two separate apparatus.

An exemplification of the invention is illustrated on the accompanying drawings. In these drawings:

Figure 1 is an elevation.

Fig. 2 is a vertical section along the longitudinal axis of the construction and Fig. 3 is a vertical section along line III—III of Fig. 2.

The rear end of the carriage frame 1 of the tractor is fitted with a jib 2, from the upper end of which the hoe drum 3 is suspended by means of a rope 4. A sheet metal lining 5 incloses the hoe drum 3 in its upper part. In a bearing 6 fixed to that lining 5 a rope pulley 7 is mounted, the rope 4 being guided over said pulley, one end being fixed to a screw threaded spindle 8. A nut 9 is in engagement with the spindle and is mounted in a bearing 10. A toothed wheel 11 is fixed to this nut 9 on one side of the bearing and a toothed wheel 12 on the other side of bearing 10. Toothed wheel 11 is co-acting with a toothed wheel 13 fixed to a friction bevel wheel 14. The latter is loosely mounted on shaft 15 and secured against axial displacement. Opposite to the friction bevel wheel 14 a second friction bevel wheel 16 is arranged which is secured against axial displacement, a toothed wheel 17 is fixed to friction wheel 16, the former, through the interposition of a toothed wheel 18, (Fig. 3) co-acting with the toothed wheel 12 at the end of the nut 9. Between the two conical friction wheels 14, 16 a sleeve 19 is arranged, which is non-rotatably connected with shaft 15 but which is adapted to glide on that shaft in an axial direction. A fork 20, adapted to swing about an axle 21 co-acts with the sleeve 19 and causes an axial displacement of the sleeve toward the friction wheel 14 or toward the friction wheel 16. The sleeve 19 is provided on one side with a friction disk 22 adapted to co-act with friction wheel 14 and at the other side with a friction disk 23 adapted to co-act with friction wheel 16. The shaft 15 is also the driving shaft for the hoe drum 3 and is rotated from a universal joint 24. The shaft 15 drives a bevel wheel 26 through the interposition of a reduction gear 25, bevel wheel 26 co-acts with wheel 27 mounted on the axle 28 and imparts rotation to the hoe spiders arranged on axle 28. The direction of rotation is indicated in Fig. 1 by arrow $p$.

Shifting the fork 20 to the right or left is carried out by a lever 29 which swings about an axle 21 as fulcrum. To the lower end of this lever 29 a rod 30 is linked which can be operated from the control gear at the driver's seat by means of rod 31 and a lever 33 swinging about axle 32. At the upper end 21' of lever 29 rods 36 and 38 are attached, connecting with tube 37 and tube 38 inclosing the spindle 8 for the purpose of causing the automatic return of sleeve 19 into a neutral position, when the extreme positions for lifting and lowering are reached.

The extreme position of the lowering movement, i. e. for the movement of the rope 4 toward the right in Fig. 2, is determined by an adjustable stop 40 which co-acts with a cam 39 provided on spindle 8. The stop 40 can be adjusted by means of a hand wheel 41 and a gearing 42 and the momentary position of the stop 40 can be read on a scale and a pointer 43. In order to prevent the spindle from rotating when the rope 4 moves in either direction, two keys 44 are provided which project into slots longitudinally arranged on the spindle 8.

When a rotation is imparted to the driving shaft 15 by the universal joint 24 in the direction of the arrow shown, the hoe drum is rotating in an anticlockwise direction (see arrow $p$ of Fig. 1). After the hoe drum has come up to speed it is lowered by pushing rod 31 from the driver's seat. Through this action rod 30 is moved toward the right as well, with the result that sleeve 19 is brought into engagement with the friction wheel 16 through the interposition of lever 29. As the sleeve rotates in the same direction as the driving shaft 15, the friction wheel 16 is rotated in the same direction as well and the nut 9 is caused by the gear wheel 12, the direction of rotation of which is shown by an arrow in Fig. 3, to rotate so that the spindle is moving toward the right. The hoe drum together with the drive for spindle 8 is lowered and swings around the axis 45. This lowering lasts until the degree of lowering the drum 3 determined by the stop 40 is reached. When cam 39 abuts against stop 40 the rod 38 is moved toward the right. The lever 38 is linked at 38' to a tube like member 39' with which the spindle along which the stop 40 is adjusted is rigidly connected. When cam 39 pushes the stop 40 to the right the tube 39' is pushed to the right as well and with it pin 38' at which lever 38 is linked. The action of the stop causes a movement of the sleeve 19 toward the left into its neutral position whereby a disengagement of friction wheel 16 and disk 23 takes place and the movement of the nut 9 and thereby of the spindle 8 is stopped. The lowering movement may be stopped at any time before the stop 40 comes into action by pushing rod 30 toward the left.

When it is intended to lift the lowered hoe drum 3 out of the soil, the rod 30 is pulled by means of the control gear at the driver's seat on the tractor, whereby sleeve 19 is moved toward the left (Fig. 2) and an operative coupling of the parts 14 and 22 takes place. In consequence thereof the nut 9 is rotated through the gearing 13, 11 in such a direction that the spindle 8 is moving toward the left and exerts a pull on the rope 4 whereby the drum is pulled out of the soil and lifted. The stopping of this lifting movement is caused automatically through spindle 8 which at the finish of its movement knocks against tube 37 inclosing the spindle 8. This tube 37 is displaceable in an axial direction and when pushed toward the left causes by means of rod 36 a swinging motion of lever 29 around the axle 21 whereby sleeve 19 is brought back into its neutral position. An interruption of the lifting movement may again be caused from the driver's seat by operating the rods and levers 31, 33, 30, 29 by hand.

It may be seen from the foregoing, that initiating the lifting and lowering movement of the hoe drum is always carried out by hand and that these movements may be stopped by hand at any position of the drum or automatically in the end positions by means of stops provided for that reason.

A strainer 46 is suspended from the covering 5 and adapted to swing around its points of suspension. Small particles of earth thrown up by the rotating hoes may pass through the strainer while larger pieces are retained. The strainer is adjustable in height by means of an adjusting device 47. Furthermore plates 49 are fixed to the lateral ends of the covering 5 which penetrate into the soil and steady the hoe drum when working against undesirable vibrations in an axial direction. The plates 49 are provided with a hole 50 taking up axle pins (not shown on the drawing) of small carrying wheels 51 which enable the hoe drum to be moved on the ground when having been detached from the tractor. Combining the hoisting mechanism with the hoe drum and with the drive for the latter insures a light construction whereby not only material is saved but also the cantalivered weight projecting beyond the frame 1 of the tractor can be kept small by which arrangement the back wheels of the tractor are relieved and the pressure on the soil does not become excessive.

The device for lifting and lowering which is actuated by the same driving shaft that imparts rotation to the hoe drum and which is united with the drive of the latter, can also be used to lift and lower a drum provided with other mechanically worked implements and tools instead of the hoes.

I claim:

1. In a rotary earth working machine, in combination with a driving shaft, a rotary earth working element operated by said shaft, a device actuated by said shaft to raise and lower said element, means supporting said shaft, said element and said device arranged to swing around a pivot provided on a vehicle carrying the shaft driving means, and means to control said raising and lowering device.

2. In a rotary earth working machine, in combination a driving shaft, a rotary earth working element operated by said shaft, a device actuated by said shaft and adapted to lift and lower said element, a casing inclosing said shaft and said lifting device, a frame rigidly fixed to said casing supporting said element, a universal joint adapted to connect said casing to a vehicle carrying the driving means for said shaft, a suspension connection between the vehicle and said frame, and means to control said device.

3. In a rotary earth working machine, in combination, a longitudinally disposed driving shaft, a rotary earth working element operated by said driving shaft, a device actuated by said shaft and adapted to lift and lower said element, a casing inclosing said shaft and said lifting device, a frame rigidly fixed to said casing supporting said element, a universal joint to connect said casing to a vehicle carrying the driving means, for said shaft, a suspension connection interposed between the vehicle and said frame, and means to control said lifting device by hand at any elevation of said element and automatically when the extreme positions of raising and lowering are reached.

4. In a rotary earth working machine, in combination a longitudinally disposed driving shaft, a rotary earth working element, operative connections intermediate said shaft and said element for rotating the latter, a casing in which said shaft and said connections are mounted and a frame rigidly fixed to said casing for carrying said element, a universal joint for connecting said casing to a vehicle carrying the driving means for said shaft, a suspension-connection, a screw threaded spindle connected to said connection and axially displaceable in said casing, a nut for said spindle, a reversing friction mechanism actuated by said shaft and imparting rotation to said nut, and means to control said reversing friction mechanism.

5. In a rotary earth working machine, in combination a longitudinally disposed driving shaft, a rotary earth working element, operative connections intermediate said shaft and said element for rotating the latter, a casing and a frame rigidly connected to each other in which said shaft, said connections and said element are mounted, a universal joint to connect said casing to a vehicle carrying the driving means for said shaft, a rope pulley fixed to said frame, a rope guided over said pulley, a screw threaded spindle adapted to be displaced in its axial direction and mounted in said casing, said rope connected to said spindle, a nut for said spindle, a reversing friction mechanism actuated by said shaft and imparting rotation to said nut, and means to control said mechanism.

6. In a rotary earth working machine, in combination, a longitudinally disposed driving shaft, a rotary earth working element, operative connections intermediate said shaft and said element, for rotating the latter, a casing and a frame rigidly connected to each other in which said shaft, said connections and said element are mounted, a universal joint adapted for connecting said casing to a vehicle carrying driving means for said shaft, a rope pulley fixed to said frame, a rope guided over said pulley, an axially displaceable screw threaded spindle and mounted in said casing to which said rope is connected, an adjustable stop to limit the displacement of said spindle in one direction, thereby limiting the lowering movement of said element, a fixed stop to limit the displacement of said spindle in the other direction thereby limiting the raising movement of said element.

7. In a rotary earth working machine, in combination, a longitudinally disposed driving shaft, a rotary earth working element, operative connections intermediate said shaft and said element for rotating the latter, a casing and a frame rigidly connected to each other in which said shaft, said connection and said element are mounted, a universal joint to connect said casing to a vehicle carrying the driving means for said shaft, a rope pulley fixed to said frame, a rope guided over said pulley, an axially displaceable screw threaded spindle mounted in said casing to which said rope is connected, a nut co-acting with said spindle, a reversing friction mechanism operatively connected to said shaft and arranged to rotate said nut in both directions, two bevel friction wheels included in said mechanism and operatively connected to said nut, a sleeve rotated by said shaft capable of coacting with either of said friction wheels, a lever to move said sleeve into engagement with either of the friction wheels, an adjustable stop to limit the displacement of said spindle in one direction, a fixed stop to limit the displacement of said spindle in the other direction, and links operatively connecting said stops to said lever for causing an automatic stopping of the spindle and thereby the raising and lowering movement when the extreme positions of said movement are attained.

8. In a rotary earth working machine, in combination, a driving shaft, a rotary earth working element to which rotation is imparted by said shaft, a device actuated by said shaft to raise and lower said element, a casing inclosing said shaft and said raising device, a frame rigidly fixed to said casing supporting said element, a covering arranged above said element and fixed to said frame, vertical plates fixed to the sides of said frame and penetrating into the soil, means mounted on said vertical plates for supporting the rotary earth working element when detached from draft means and means to control said raising device.

9. In a rotary earth working machine, a frame a universal connection at its forward end, a flexible suspension for the frame to the rear of said connection a positively driven digging element in said frame, a driving shaft having a universal joint at said connection and means on said frame operated from said shaft to lengthen and shorten said suspension to raise and lower the frame.

In testimony that I claim the foregoing as my invention, I have signed my name.

ARNOLD RUTISHAUSER.